US010127343B2

(12) United States Patent
Suiter et al.

(10) Patent No.: US 10,127,343 B2
(45) Date of Patent: Nov. 13, 2018

(54) CIRCUIT DESIGN LAYOUT IN MULTIPLE SYNCHRONOUS REPRESENTATIONS

(71) Applicant: Mentor Graphics Corporation, Wilsonville, OR (US)

(72) Inventors: Gerald Suiter, Madison, AL (US); Edwin Smith, Athens, AL (US); Henry Potts, Ft. Collins, CO (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/567,488

(22) Filed: Dec. 11, 2014

(65) Prior Publication Data

US 2016/0171143 A1    Jun. 16, 2016

(51) Int. Cl.
| | |
|---|---|
| *G06F 17/50* | (2006.01) |
| *G06F 3/0484* | (2013.01) |
| *H05K 3/46* | (2006.01) |
| *H05K 1/02* | (2006.01) |
| *G06F 3/023* | (2006.01) |
| *G06F 1/16* | (2006.01) |

(52) U.S. Cl.
CPC ...... *G06F 17/5072* (2013.01); *G06F 17/5081* (2013.01); *G06F 1/1652* (2013.01); *G06F 3/023* (2013.01); *G06F 3/04842* (2013.01); *G06F 17/5045* (2013.01); *G06F 17/5068* (2013.01); *G06F 2203/0338* (2013.01); *G06F 2217/40* (2013.01); *H05K 1/0298* (2013.01); *H05K 3/46* (2013.01)

(58) Field of Classification Search
CPC .... H05K 1/0298; H05K 3/46; G06F 17/5045; G06F 17/50; G06F 17/5072; G06F 17/5068; G06F 17/5081; G06F 1/1652; G06F 3/023

See application file for complete search history.

(56) References Cited

U.S. PATENT DOCUMENTS

| | | | | |
|---|---|---|---|---|
| 5,109,479 | A | * | 4/1992 | Williams ................. G03F 7/20 345/582 |
| 5,912,809 | A | * | 6/1999 | Steigerwald ......... H05K 1/0262 174/255 |
| 6,536,028 | B1 | * | 3/2003 | Katsioulas .......... G06F 17/5068 716/114 |

(Continued)

*Primary Examiner* — Helen Rossoshek
(74) *Attorney, Agent, or Firm* — Mentor Graphics Corporation

(57) ABSTRACT

This application discloses a computing system implementing tools and mechanisms to synchronize multiple layouts for a circuit design during the layout process. The tools and mechanisms can implement multiple communicating kernels, each to manage at least one of the layouts. In response to an alteration of one of the layouts, the kernels can communicate with each other, so that the kernel corresponding to the unaltered layout can automatically augment corresponding layouts for the circuit design to synchronize with the altered layout. At least one of the layouts can include a 3-dimensional layout representation of the circuit design, the tools and mechanisms can perform 3-dimensional design rule checking based on mechanical constraints and 3-dimensional solid component models in response to alterations to a 2-dimensional layout representation of the circuit design.

20 Claims, 8 Drawing Sheets

(56) References Cited

U.S. PATENT DOCUMENTS

| | | | | |
|---|---|---|---|---|
| 6,670,558 B2* | 12/2003 | Dabral | H05K 1/0224 | 174/260 |
| 6,708,313 B2* | 3/2004 | Pfeil | G06F 17/5068 | 707/E17.007 |
| 6,711,718 B2* | 3/2004 | Pfeil | G06F 17/50 | 716/137 |
| 7,257,793 B2* | 8/2007 | Okano | G06F 17/5068 | 716/139 |
| 7,334,208 B1* | 2/2008 | Cox | G06F 17/5081 | 716/129 |
| 7,398,128 B2* | 7/2008 | Arita | G06T 17/00 | 345/420 |
| 7,516,435 B2* | 4/2009 | Petunin | G06F 17/5068 | 709/203 |
| 7,587,695 B2* | 9/2009 | Petunin | G06F 17/5068 | 703/20 |
| 7,933,672 B2* | 4/2011 | Tenma | G06F 17/50 | 700/97 |
| 8,255,849 B1* | 8/2012 | Okhmatovski | G06F 17/5018 | 716/110 |
| 8,316,342 B1* | 11/2012 | Kukal | G06F 17/5045 | 703/13 |
| 8,326,926 B2* | 12/2012 | Sangem | G06F 17/5068 | 709/204 |
| 8,438,524 B1* | 5/2013 | Kohli | G06F 17/5068 | 716/120 |
| 8,584,077 B1* | 11/2013 | Kumar | G06F 17/5077 | 703/14 |
| 8,762,927 B2* | 6/2014 | Nakamura | G06F 17/5045 | 716/104 |
| 8,769,451 B2* | 7/2014 | Yuh | G06F 17/5045 | 716/104 |
| 2003/0131326 A1* | 7/2003 | Pfeil | G06F 17/50 | 716/137 |
| 2005/0044521 A1* | 2/2005 | Swope | G06F 17/5068 | 716/102 |
| 2005/0183052 A1* | 8/2005 | Ash-Rafzadeh | G06F 17/50 | 716/126 |
| 2008/0082945 A1* | 4/2008 | Konno | G06F 17/50 | 716/136 |
| 2009/0326874 A1* | 12/2009 | Nakamura | G06F 17/50 | 703/1 |
| 2010/0005438 A1* | 1/2010 | Nakamura | G06F 17/5045 | 716/119 |
| 2011/0252163 A1* | 10/2011 | Villar | G06F 17/5027 | 710/16 |
| 2013/0007692 A1* | 1/2013 | Yeh | G06F 17/5036 | 716/136 |
| 2013/0014070 A1* | 1/2013 | Su | G06F 17/5036 | 716/115 |
| 2013/0055183 A1* | 2/2013 | Beakes | G06F 17/5081 | 716/111 |
| 2013/0181257 A1* | 7/2013 | Ngai | H03K 19/17744 | 257/209 |
| 2013/0212544 A1* | 8/2013 | Yu | G06F 17/5045 | 716/55 |
| 2014/0096102 A1* | 4/2014 | Fu | G06F 17/50 | 716/133 |
| 2014/0237310 A1* | 8/2014 | Cheng | G01R 31/31855 | 714/727 |
| 2014/0246705 A1* | 9/2014 | Huang | G01R 31/31851 | 257/209 |
| 2014/0347088 A1* | 11/2014 | Huang | G01R 31/31717 | 324/762.01 |
| 2015/0128102 A1* | 5/2015 | Perry | G06F 17/5081 | 716/137 |
| 2016/0086461 A1* | 3/2016 | Geng | H04N 5/2251 | 348/143 |

* cited by examiner

CIRCUIT DESIGN LAYOUT IN MULTIPLE SYNCHRONOUS REPRESENTATIONS

TECHNICAL FIELD

This application is generally related to electronic design automation and, more specifically, to circuit design layout with multiple synchronous representations.

BACKGROUND

The development of electronic devices with printed circuit boards typically involves many steps, known as a design flow. This design flow typically starts with a specification for a new circuit to be implemented with a printed circuit board. The specification of the new circuit can be transformed into a circuit design, such as a netlist, for example, by a schematic capture tool or by synthesizing a logical circuit design, sometimes referred to as a register transfer level (RTL) description of the circuit. The netlist, commonly specified in an Electronic Digital Exchange Format (EDIF), can describe nets or connectivity between various devices or instances in the circuit design.

The design flow continues by verifying functionality of the circuit design, for example, by simulating or emulating the circuit design and verifying that the results of the simulation or emulation correspond with an expected output from the circuit design. The functionality also can be verified by statically checking the circuit design for various attributes that may be problematic during operation of an electronic device built utilizing the circuit design.

Once the circuit design has been functionally verified, the design flow continues to design layout and routing, which includes placing and interconnecting various components into a representation of a printed circuit board. This procedure can be implemented in many different ways, but typically, through the use of a layout tool, which can present a two-dimensional graphical view of the printed circuit board and allow a designer to drag or place parts from a library onto the printed circuit board. The layout tool can validate the electronic device and perform various design rule checks on placed parts to ensure that the electronic device can be effectively manufactured.

Since many electronic devices made on printed circuit boards will be included within a product, the placement and routing of the components on the printed circuit board may be constrained to ensure the product can be effectively manufactured. Some of these constraints can be derived from the industrial or mechanical design of the product that will eventually house the printed circuit board. These mechanical constraints can include such things as physical mounting information, dimensions of an enclosure in which the printed circuit board will reside, presence of mechanical heat dissipation devices, or the like.

Conventionally, these mechanical constraints have been provided to the layout tool on an ad hoc basis, often through collaboration between electrical design and mechanical or industrial design teams at various times through the product design process. Some layout tools can extrapolate limited attributes associated with these mechanical constraints from mechanical designs shared via an intermediate data format (IDF) exchange interface with other tools developing the product. For example, these layout tools can identify a location of where a printed circuit board is to mounted to a product based on the mechanical designs shared via the IDF exchange interface, but not size or shape of a mounting hole or physical dimensions of a faster utilized to affix the printed circuit board to the product via the mounting hole. This lack of information can lead to a lack of congruency between the mechanical design and the printed circuit board design. Since, in most product design flows, the industrial or mechanical design has the highest priority, this lack of congruency prompts the electrical design teams to iteratively re-design the electronic device implemented with the printed circuit board, which can lengthen a time to market for the product.

SUMMARY

This application discloses a computing system implementing tools and mechanisms to synchronize multiple layouts for a circuit design during the layout process. The tools and mechanisms can implement multiple communicating kernels, each to manage at least one of the layouts. In response to an alteration of one of the layouts, the kernels can communicate with each other, so that the kernel corresponding to the unaltered layout can automatically augment corresponding layouts for the circuit design to synchronize with the altered layout. At least one of the layouts can include a 3-dimensional layout representation of the circuit design, the tools and mechanisms can perform 3-dimensional design rule checking based on mechanical constraints and 3-dimensional solid component models in response to alterations to a 2-dimensional layout representation of the circuit design.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
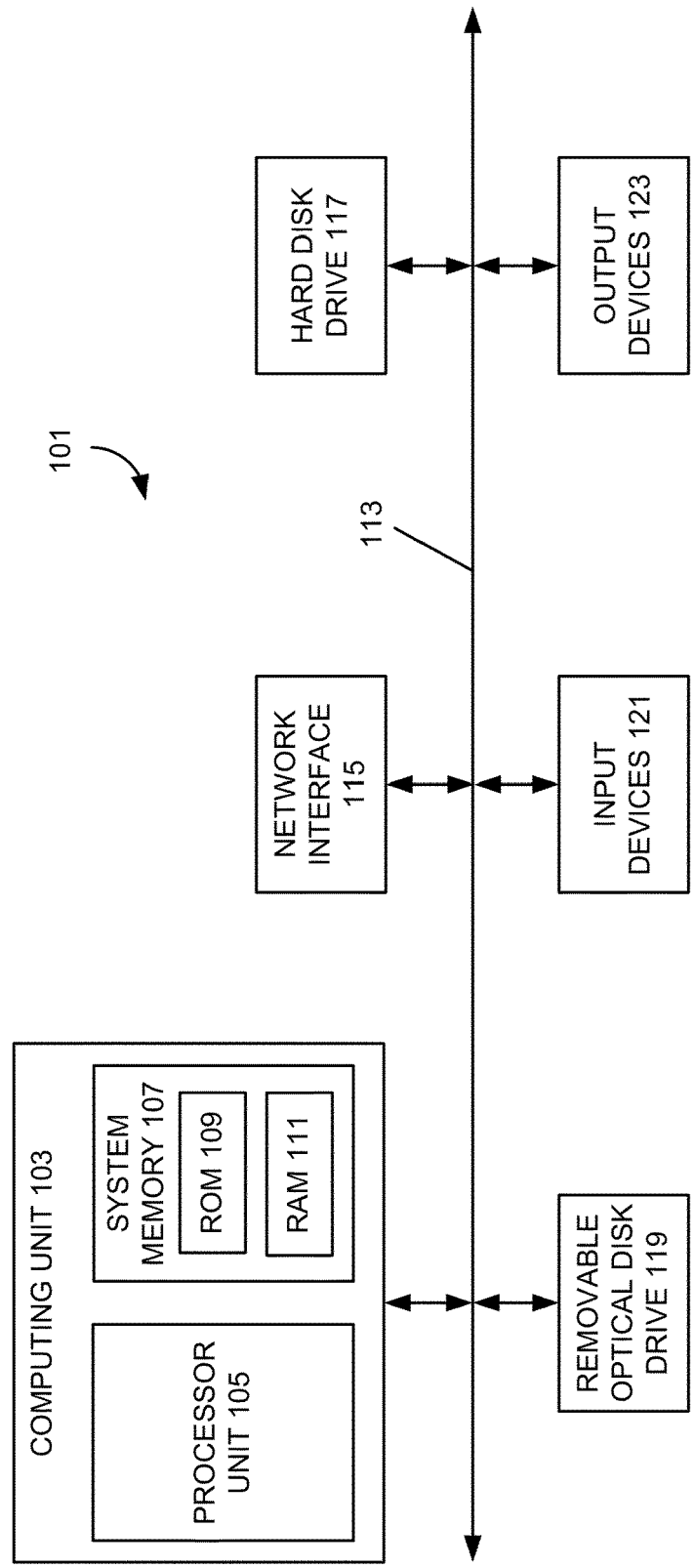
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computer 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to one or more network interfaces for communicating with other devices making up a network. The network interface translates data and control signals from the computing unit 103 into network messages according to one or more communication protocols, such as the transmission control protocol (TCP) and the Internet protocol (IP). Also, the interface may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
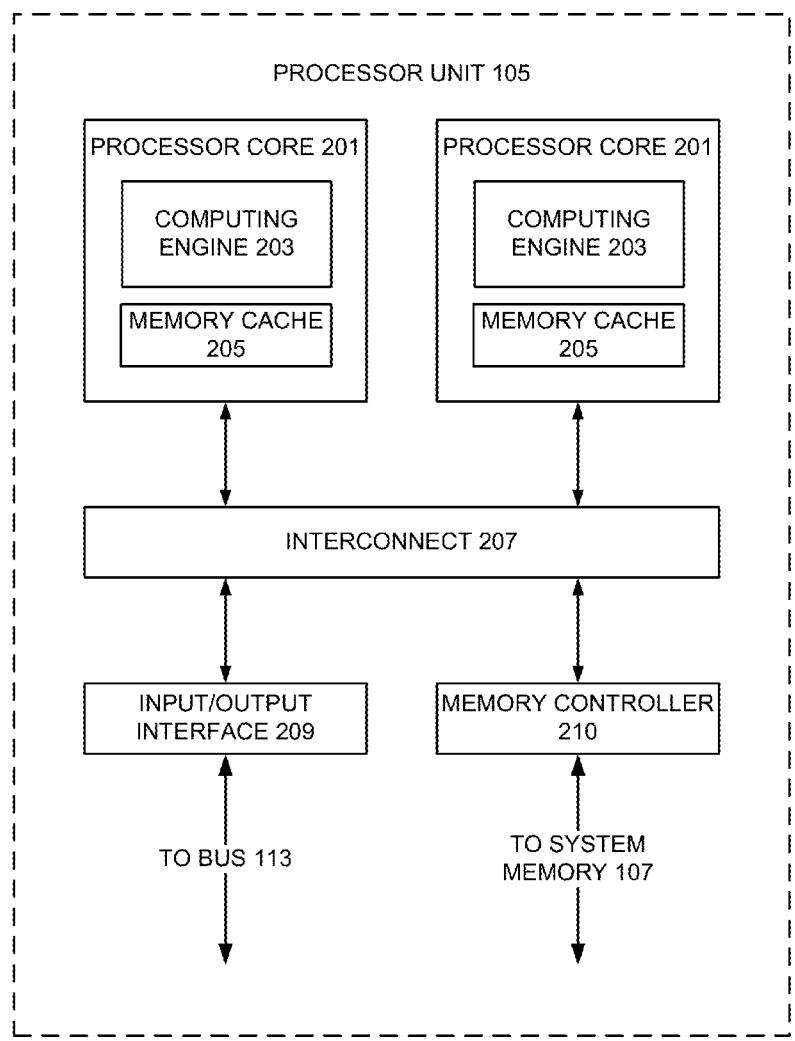

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210 The input/output interface 209 provides a communication interface between the processor unit 201 and the bus 113. Similarly, the memory controller 210 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Distributed Design System

Figure 3:
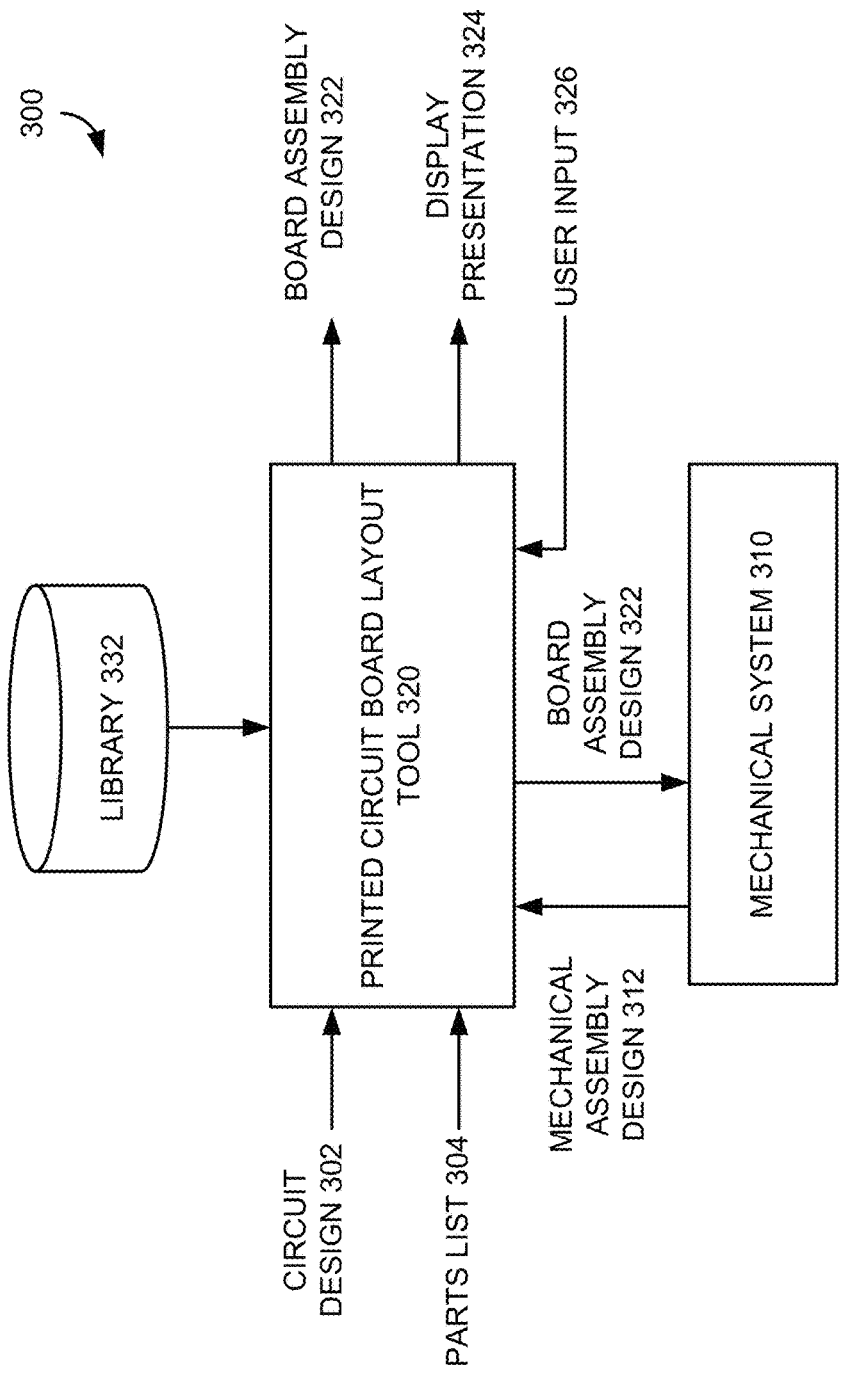
FIG. 3 illustrates an example of a design system according to various embodiments of the invention.

FIG. 3 illustrates an example of a design system 300 according to various embodiments of the invention. Referring to FIG. 3, the design system 300 can be a distributed design environment, which allows different aspects of product design to be performed by different communicating tools or systems. For example, the design system 300 can include a mechanical system 310 to develop a mechanical assembly design 312 for a product, and a printed circuit board layout tool 320 to develop a board assembly design 322 for an electronic device, which can be included in the product.

The mechanical assembly design 312 can describe various physical design elements associated with the product, such as a design for a housing of the product. In some examples, the design for the housing can include locations and dimensions of electronic system(s) and physical interfaces, such as a display device, a touchscreen, an image capture device, input/output devices, electrical ports, audio devices, or the like. The mechanical assembly design 312 also can describe physical mounting information for the physical interfaces and electronic system(s), describe physical connectivity of the physical interfaces and electronic system(s) to each other and to the housing of the product, describe a presence of mechanical heat dissipation devices in the product, or the like.

The board assembly design 322 can describe the electronic device for the product in terms of various components placed and interconnected on a representation of a printed circuit board. The printed circuit board layout tool 320 can provide a design environment to layout a circuit design 302, which can describe the electronic device as sets of interconnected components, into the board assembly design 322 by placing parts or components from a parts list 304 onto the representation of printed circuit board.

The mechanical system 310 and the printed circuit board layout tool 320 can exchange design information with each other. For example, the printed circuit board layout tool 320 can output the board assembly design 322 to the mechanical system 310 or a memory system (not shown) directly or indirectly accessible by the mechanical system 310. Likewise, the mechanical system 310 can output the mechanical assembly design 312 to the printed circuit board layout tool 320 or a memory system (not shown) directly or indirectly accessible by the printed circuit board layout tool 320. The mechanical system 310 and the printed circuit board layout tool 320 can share their respective designs with each other at any point during the design process, for example, through an exchange of design files in the form of STEP (Standard for the Exchange of Product model data) and/or SAT (Standard ACIS Text) files. The format of a STEP file, in some embodiments, can be defined in (International Organization for Standardization) ISO 10303-21, entitled "Industrial automation systems and integration—Product data representation and exchange—Part 21: Implementation methods: Clear text encoding of the exchange structure."

The printed circuit board layout tool 320 can analyze the mechanical assembly design 312 to identify mechanical constraints that can limit or constrain the board assembly design 322. As discussed above, the mechanical constraints can include a description of an enclosure in which the board assembly design 322 is to fit in the mechanical assembly design 312, locations and description of fasteners utilized to adhere a printed circuit board manufactured according to the board assembly design 322 to a housing described in the mechanical assembly design 312, presence and location of other mechanical devices, such as heat dissipation devices or physical interfaces in the mechanical assembly 312, or the like. The printed circuit board layout tool 320 can develop a set of design rules based on the mechanical constraints identified or parsed from the mechanical assembly design 312. As will be described below in greater detail, during layout operations, the printed circuit board layout tool 320 can check portions of the board assembly design 322 for violations of the developed set of design rules as well as any other electro-mechanical design rules populated into or accessible by the printed circuit board layout tool 320.

The mechanical system 310 can analyze the board assembly design 322 to determine whether the layout of the electronic device described in the board assembly design 322 remains congruent with the mechanical assembly design 312. This exchange of design files between the mechanical system 310 and the printed circuit board layout tool 320 can allow for a dynamic understanding of how alterations or additions to the mechanical assembly 312 and the board assembly design 322 can affect design efforts by other groups developing different portions of the product.

The printed circuit board layout tool 320 can receive the circuit design 302, such as a netlist, which can describe components in an electronic device and the connectivity of those components to each other. In some embodiments, the netlist can be generated by a schematic capture tool or by synthesizing a logical circuit design, sometimes referred to as a register transfer level (RTL) description of the circuit. The netlist can be specified in an Electronic Digital Exchange Format (EDIF), which can describe nets or connectivity between various components or instances in the circuit design 302. The printed circuit board layout tool 320 also can receive the parts list 304 including multiple parts that can correspond to the components described in the circuit design 302. Although FIG. 3 shows the printed circuit board layout tool 320 receiving the circuit design 302 and the parts list 304, in some embodiments, the printed circuit board layout tool 320 can generate the circuit design 302 and/or parts list 304 internally.

The printed circuit board layout tool 320 can output a display presentation 324 that, when displayed by a display device, can provide an user interface to the design environment, allowing the printed circuit board layout tool 320 to generate the board assembly design 322 in response to user input 326. As will be discussed below in greater detail, the display presentation 324 can include a graphical display window including at least one representation of the board assembly design 322 and include various tools or embedded functionality that can allow placement of parts or components from the parts list 304 into the board assembly design 322.

The board assembly design 322 initially can represent a blank print circuit board, for example, having dimensions corresponding to one or more of the mechanical constraints gleaned from the mechanical assembly design 312. The printed circuit board layout tool 320 can receive user input 326, for example, based on the display presentation 324, which can prompt the printed circuit board layout tool 320 to perform various updates to the board assembly design 322 based on the circuit design 302, such as place parts selected from the parts list 304 in the board assembly design 322, route traces between the placed parts, or the like. In some embodiments, the printed circuit board layout tool 320, in response to a user selection of a part from the parts list 304, can access a library 332 to identify a component model corresponding to the selected part capable of being placed in the representation of the board assembly design 322.

The printed circuit board layout tool 320 can perform various design rule checks on the board assembly design 322 to determine whether the updates in the board assembly design 322 violate any design rules. For example, the printed circuit board layout tool 320 can review locations and characteristics of component models placed in the representation of the printed circuit board to determine whether the component models, as placed, conform to the design rules. The printed circuit board layout tool 320 can update the display presentation 324 based on the user input 326, for example, to illustrate the placement of a selected part or route of a trace line and highlight conformance or lack thereof with at least one of the design rules, which can be displayed or presented by the display device. This interactive design process can continue until layout of the circuit design 302 has been completed and thus the printed circuit board layout tool 320 has generated the board assembly design 322 congruent with the mechanical assembly design 312. Since the mechanical system 310 and the printed circuit board layout tool 320 can exchange their respective designs with each other at any time during the design process, any changes in one design that conflict with another design can be caught and rectified earlier in the process.

Printed Circuit Board Layout Tool

Figure 4:
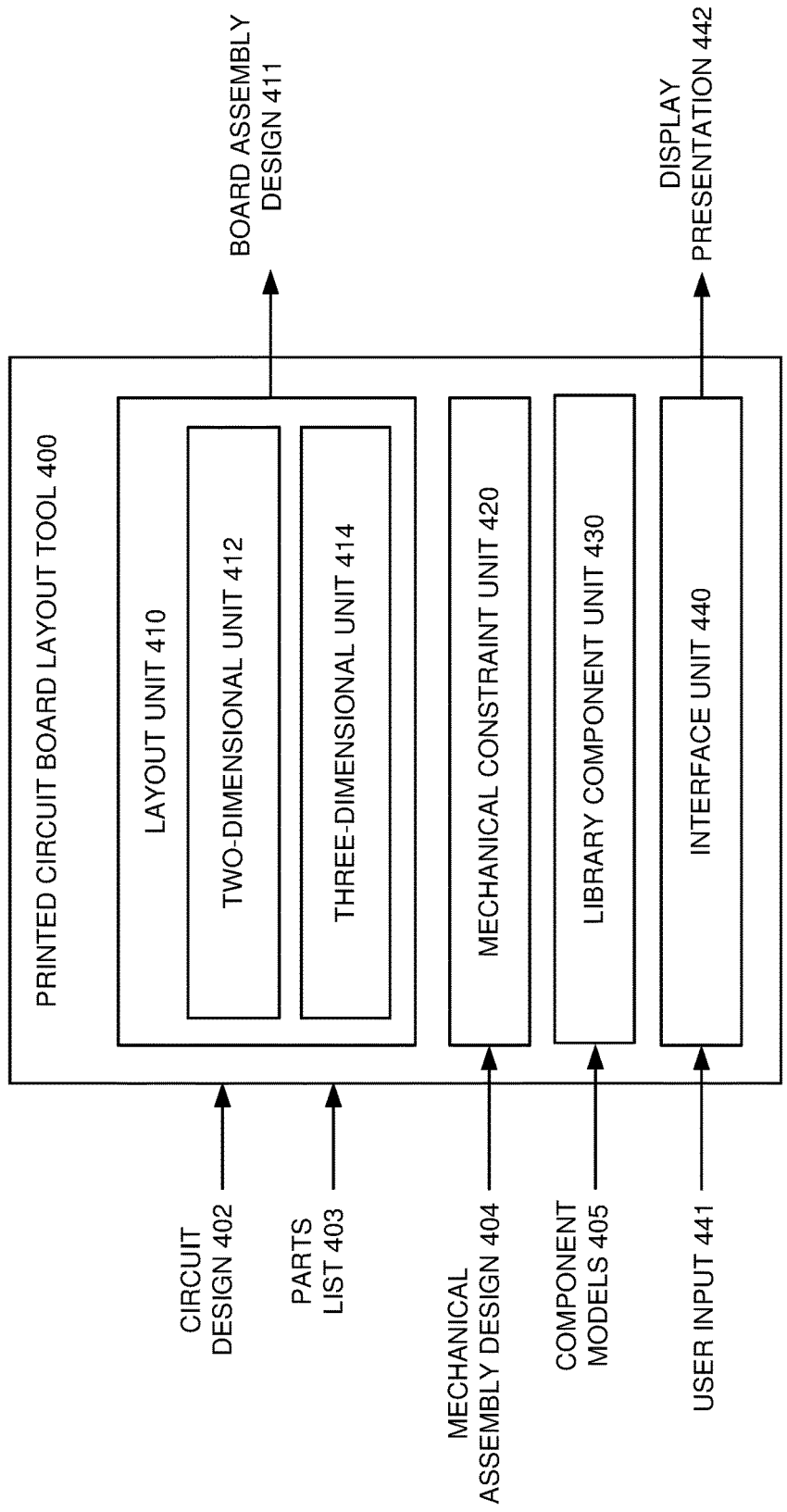
FIG. 4 illustrates an example of a printed circuit board layout tool according to various embodiments of the invention.
Figure 8:
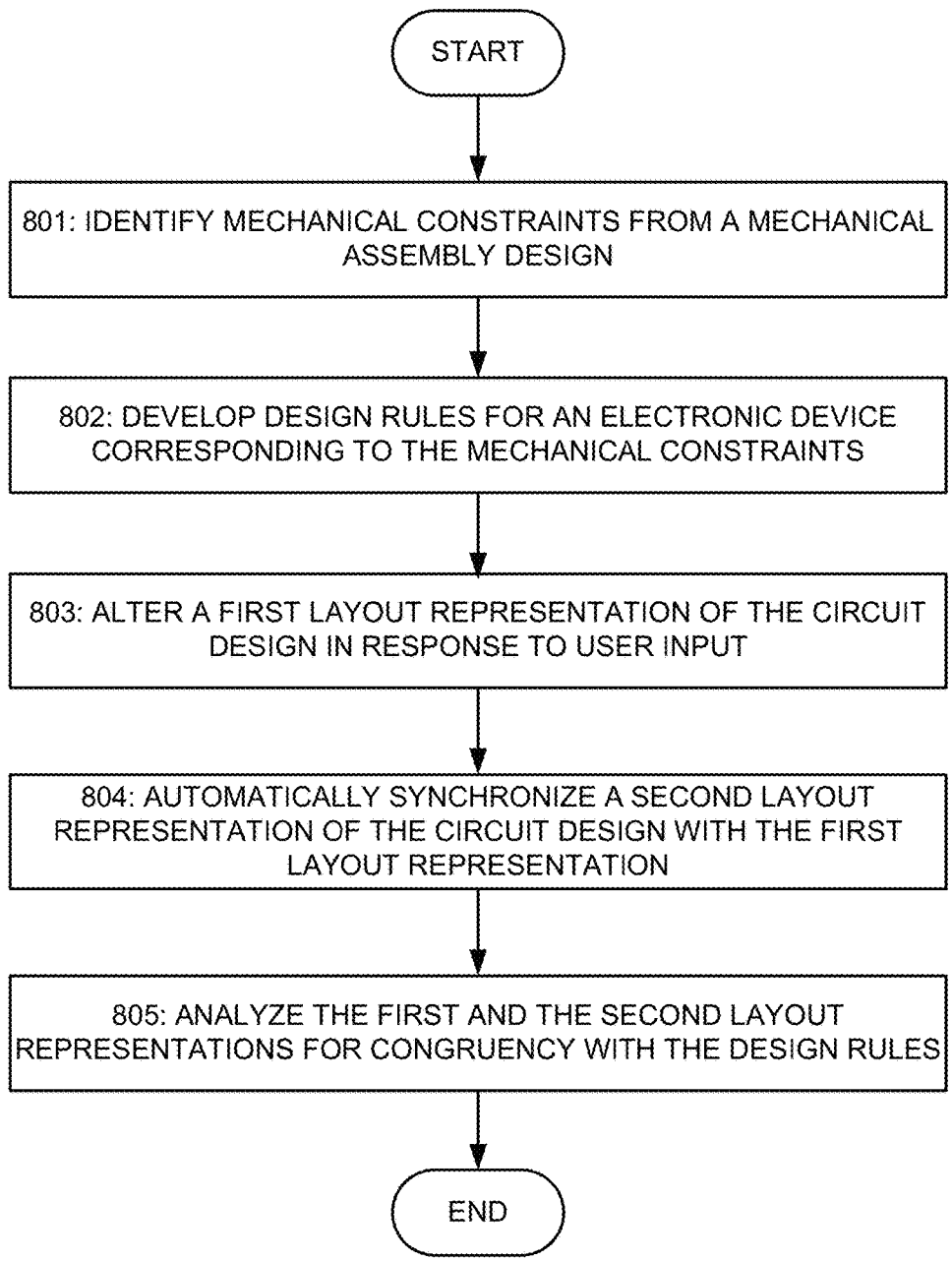
FIG. 8 illustrates an example flowchart for synchronizing different printed circuit board layouts according to various embodiments of the invention.

FIG. 4 illustrates an example of a printed circuit board layout tool 400 according to various embodiments of the invention and FIG. 8 illustrates an example flowchart for synchronizing different printed circuit board layouts according to various embodiments of the invention. Referring to FIGS. 4 and 8, the printed circuit board layout tool 400 can include a layout unit 410 to layout a circuit design 402 with parts from a parts list 403, which generates a board assembly design 411. The circuit design 402, such as a netlist, can describe components in an electronic device and the connectivity of those components to each other. In some embodiments, the netlist can be generated by a schematic capture tool or by synthesizing a logical circuit design, sometimes referred to as a register transfer level (RTL) description of the circuit. The netlist can be specified in an Electronic Digital Exchange Format (EDIF), which can describe nets or connectivity between various components or instances in the circuit design 402. The parts list 403 can include multiple parts that can correspond to the components described in the circuit design 402. Although FIG. 4 shows the printed circuit board layout tool 400 receiving the circuit design 402 and the parts list 404, in some embodiments, the printed circuit board layout tool 400 can generate the circuit design 402 and/or parts list 404 internally.

The layout unit 410 can include a two-dimensional unit 412 to generate a layout representation of the circuit design 402, which can be a two-dimensional version of the board assembly design 411. The layout representation of the circuit design 402 can, for example, be embodied in a 2.5-dimensional data model with 2.5-dimensional component models, such as component models 405. The layout representation of the circuit design 402 also can include a two-dimensional graphical presentation, for example, based on the 2.5-dimensional data model. In some embodiments, the two-dimensional unit 412 can be a two-dimensional kernel, for example, implemented by a computing system in response to computer-executable instructions, which can generate a 2.5-dimensional data model of the board assembly design 411.

The layout unit 410 can include a three-dimensional unit 414 to generate a layout representation of the circuit design 402, which can be a three-dimensional version of the board assembly design 411. The layout representation of the circuit design 402 can, for example, be embodied in a three-dimensional data model. The three-dimensional data model can include three-dimensional characteristics and parameters of the printed circuit board and three-dimensional component solid models, such as component models 405, placed on the printed circuit board. The three-dimensional component solid models can describe a three-dimensional physical structure of each component placed on in the three-dimensional version of the board assembly design 411, including specific configurations of the connectors. The layout representation of the circuit design 402 also can include a three-dimensional graphical presentation, for example, based on the three-dimensional data model, which, in some embodiments, can provide a photo realistic visualization of the three-dimensional version of the board assembly design 411. In some embodiments, the three-dimensional unit 414 can be a three-dimensional kernel, for example, implemented by a computing system in response to computer-executable instructions, which can generate a three-dimensional data model of the board assembly design 411.

The printed circuit board layout tool 400 can identify mechanical constraints from a mechanical assembly design, for example, as described in a block 801 of FIG. 8. The printed circuit board layout tool 400 can develop design rules for an electronic device corresponding to the mechanical constraints, for example, as described in a block 802 of FIG. 8. In some embodiments, the printed circuit board layout tool 400 can include a mechanical constraint unit 420 to receive a mechanical assembly design 404, for example, directly from a mechanical design system or indirectly via an interface or memory system. In some embodiments, the mechanical assembly design 404 can be a design file in the form of a STEP file and/or a SAT file. Although FIG. 4 shows the mechanical constraint unit 420 as being separate from the layout unit 410, in some embodiments, the one or more instances of the mechanical constraint unit 420 can be included in the layout unit 410.

The mechanical constraint unit 420 can analyze the mechanical assembly design 404 to identify mechanical constraints that can limit or constrain layout of the circuit design 402 into the board assembly design 411. In some embodiments, the mechanical constraints can include a description of an enclosure that the board assembly design 411 is to fit into, locations and description of fasteners utilized to adhere a printed circuit board manufactured according to the board assembly design 411 to a housing described in the mechanical assembly design, presence and location of other mechanical devices, such as heat dissipation devices or physical interfaces in the mechanical assembly, or the like.

The mechanical constraint unit 420 can develop a set of design rules based on the mechanical constraints identified or parsed from the mechanical assembly design. The set of design rules can correspond to the mechanical constraints, such that when a layout of a print circuit board violates a design rule, the layout of a print circuit board would be inconsistent with the mechanical assembly design from which the mechanical constraints were derived or identified. The printed circuit board layout tool 400 can incorporate or associate the set of design rules developed by the mechanical constraint unit 420 with a master set of electro-mechanical design rules utilized by the printed circuit board layout tool 400 in design rule checks.

The printed circuit board layout tool 400 can include an interface unit 440 to output a display presentation 442 that, when displayed by a display device, can provide a user interface to the design environment. The display presentation 442 can include a graphical display window including at least one layout representation of the board assembly design 411 from the layout unit 410 and include various tools or embedded functionality that can allow placement of parts or components from the parts list 403 into the layout representation of the board assembly design 411. In some embodiments, the interface unit 440 can receive a two-dimensional layout representation and/or a three-dimensional layout representation of the board assembly design 411 from the two-dimensional unit 412 and the three-dimensional unit 414, respectively, and selectively insert the recited layout representations in the display presentation 442. Although FIG. 4 shows the interface unit 440 as being separate from the layout unit 410, in some embodiments, the one or more instances of the library component unit 430 can be included in the interface unit 440.

Figure 5:
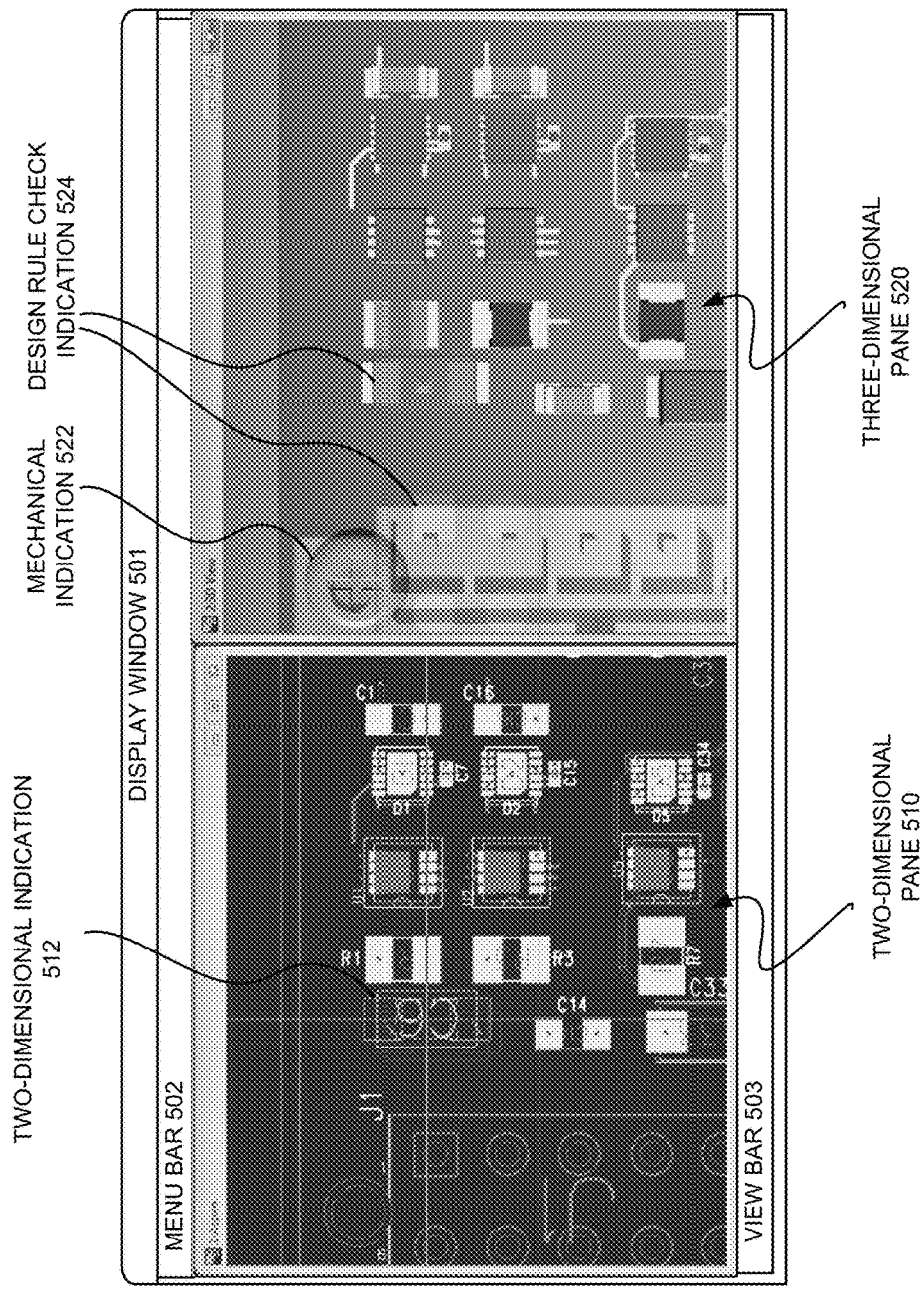
FIG. 5 illustrates an example implementation of a display window presenting multiple representations of different printed circuit board layouts according to various embodiments of the invention.

FIG. 5 illustrates an example implementation of a display window presenting multiple representations of different printed circuit board layouts according to various embodiments of the invention. Referring to FIG. 5, the display window 501 can include a two-dimensional pane 510 and a three-dimensional pane 520. The two-dimensional pane 510 can include a two-dimensional graphical view of a board assembly design. The three-dimensional pane 520 can include a three-dimensional graphical view of the same board assembly design. In some embodiments, the two-dimensional graphical view and three-dimensional graphical view can be synchronized, for example, that they include the same components and traces placed in the same portions of the board assembly design. The two-dimensional pane 510 and the three-dimensional pane 520 can also be synchronized in which view of the board assembly design they present, for example, where a change in view in one of the panes prompts a corresponding change in the other pane. In other words, two-dimensional pane 510 and the three-dimensional pane 520 can be interrelated, with a selection in one pane causing corresponding portions of the other pane to automatically scroll into view.

The two-dimensional graphical view in the two-dimensional pane 510 can include various graphical representations of components and routing traces as placed in the board assembly design. The three-dimensional graphical view in the three-dimensional pane 520 can include various graphical representations of solid model components and routing traces as placed in the board assembly design. The three-dimensional graphical view in the three-dimensional pane 520 can include mechanical indications 522, which can show mechanical features, such as through holes and corresponding fasteners. Since the shape of the two-dimensional components in the two-dimensional pane 510 can differ from the three-dimensional component solid models in the three-dimensional pane 520, in some embodiments, a two-dimensional indication 512, such as an outline of the shape of the three-dimensional component, can be overlaid in the two-dimensional pane 510. The three-dimensional graphical view in the three-dimensional pane 520 also can provide a design rule check indication 524, such as by altering a shape, color, or otherwise visually augmenting the three-dimensional graphical view to annunciate a consistence or lack thereof to one or more design rules. When a placed component has a mechanical-based design rule that limits its height, for example, due to a housing or enclosure requirement or due to an adjacently placed component part (a manufacturing difficulty or impossibility requirement), the design rule check indication 524 can visually indicate whether the placed component violates that mechanical-based design rule, encroaches on the mechanical-based design rule, or is consistent with the mechanical-based design rule. Embodiments of the design rule check indication 524 will be described below in greater detail.

The display window 501 can include a menu bar 502 having various mechanisms to selectively enable layout operations, graphical manipulation, or the like, in at least one of the two-dimensional pane 510 or the three-dimensional pane 520. The display window 501 also can include a view bar 503, which can present mechanisms that, when utilized, can prompt the display window 501 to alter the view presented in at least one of the panes 510 or 520. For example, the view bar 503 includes mechanisms that can prompt rotation of the graphics, a change of viewing angle, introduce cut planes, allow for measurement with point, axis, facement, or the like, in at least one of the panes 510 or 520.

Figure 6:
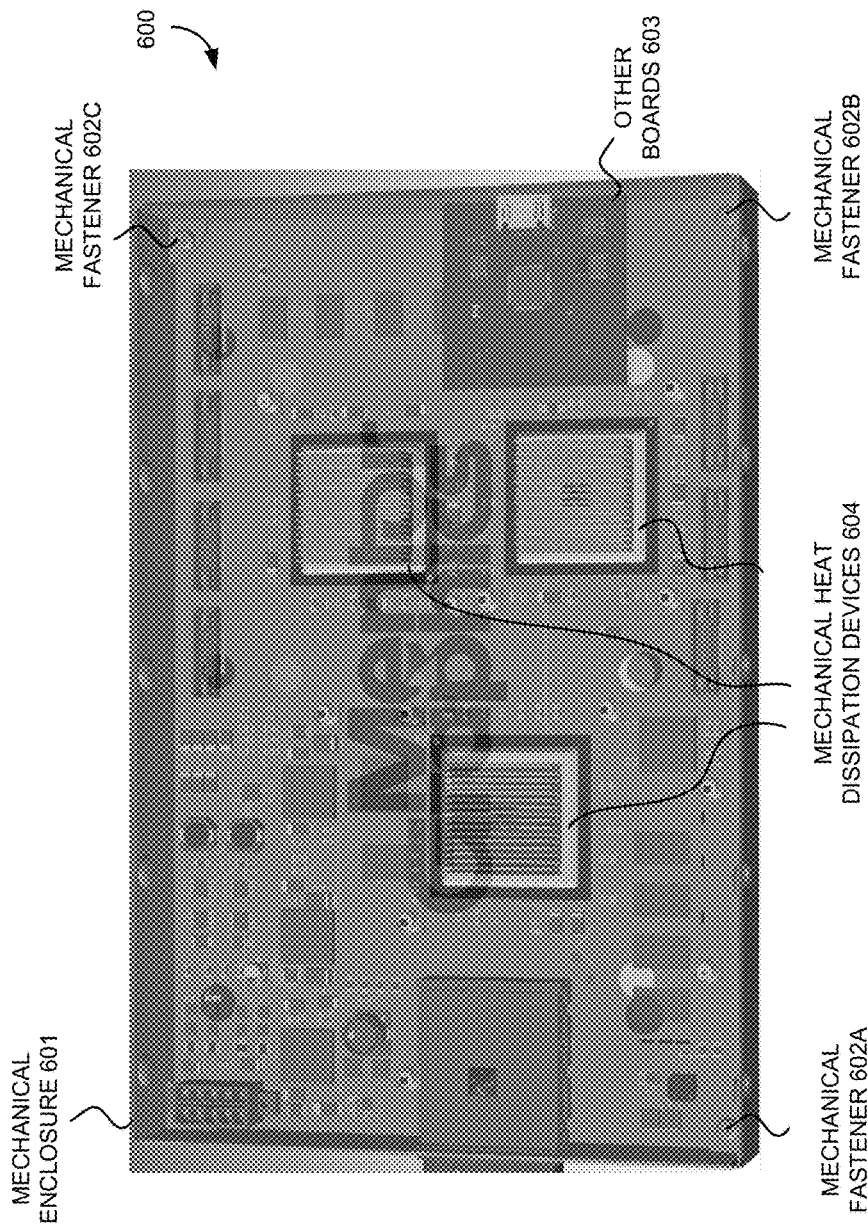
FIG. 6 illustrates an example three-dimensional representation of a printed circuit board layout with mechanical constraints according to various embodiments of the invention.

FIG. 6 illustrates an example three-dimensional representation 600 of a printed circuit board layout with mechanical constraints according to various embodiments of the invention. Referring to FIG. 6, the three-dimensional representation 600 of the printed circuit board layout can include various three-dimensional component solid models that represent parts in the printed circuit board layout. The three-dimensional representation 600 of the printed circuit board layout also can include a representation of mechanical features, for example, as derived or identified from a mechanical assembly design of a product configured to the include the printed circuit board shown in the three-dimensional representation 600.

The representation of mechanical features can include a description of a mechanical enclosure 601, for example, which can be configured to house the printed circuit board shown in the three-dimensional representation 600. The representation of mechanical features can include a description of mechanical fasteners, such as screws, 602A-602C, which can be configured to affix the printed circuit board shown in the three-dimensional representation 600 to the mechanical enclosure 601 or other portions of the product. The representation of mechanical features can include a description of additional devices, such as other printed circuit board 603, mechanical heat dissipation devices 604, or the like, configured to couple to the printed circuit board shown in the three-dimensional representation 600. By including the representation of mechanical features along with the printed circuit board layout in the three-dimensional representation 600, layout operations can be conducted in a manner that avoids conflict with a mechanical constraint or inconsistency with a mechanical assembly design configured to house or couple to the printed circuit board shown in the three-dimensional representation 600.

Referring back to FIG. 4, the layout unit 410 can initially represent the board assembly design 411 as a blank print circuit board, for example, having dimensions corresponding to one or more of the mechanical constraints gleaned from the mechanical assembly design. As discussed above, the layout unit 410 can represent of the board assembly design 411 with a single data model or with multiple different data models, for example, a 2.5-dimensional data model and a three-dimensional data model.

The layout unit 410 can receive user input 441, for example, based on the display presentation 442, which can prompt the layout unit 410 to perform various updates to the data models corresponding to the board assembly design 411. In some embodiments, the user input 441 can identify a part selected from the parts list 403 and identify a location in the board assembly design 411 for placement of the selected part. The layout unit 410 can place at least one component model that corresponds to the selected part in the data model corresponding to the identified location in the board assembly design 411, route traces between the placed parts based on the connectivity in the circuit design 402, or the like.

The printed circuit board layout tool 400 can include a library component unit 430 to identify one or more component models 405 that correspond to the selected part. In some embodiments, the layout unit 410 can provide an indication of the selected part to the library component unit 430, and the library component unit 430 can access a library (not shown) to identify a component model corresponding to the selected part capable of being placed in the board assembly design 411. Since the library can include 2.5-dimensional component models and/or three-dimensional solid component models, in some embodiments, the layout unit 410 also can provide an indication of which type of component model 405 for the library component unit 430 to retrieve from the library. Although FIG. 4 shows the library component unit 430 as being separate from the layout unit 410, in some embodiments, the one or more instances of the library component unit 430 can be included in the layout unit 410.

Since the layout unit 400 can provide multiple different layout representations of the board assembly design 411, for example, a two-dimensional version of the board assembly design 411 by the two-dimensional unit 412 and a three-dimensional version of the board assembly design 411 by the three-dimensional unit 414, the layout unit 400 can also automatically synchronize these layout representations. The layout representation of the board assembly design 411 can correspond to a data model of the board assembly design 411 or a graphical presentation of the board assembly design 411, for example, which can be represented in various dimensions, such as two-dimensions, 2.5-dimensions, three-dimensions, or the like.

In a block 803, the printed circuit board layout tool can alter a first layout representation of the circuit design in response to user input, and in a block 804, the printed circuit board layout tool can automatically synchronize a second layout representation of the circuit design with the first layout representation. For example, when the interface unit 440 receives user input 441 requesting an alteration in one layout representation of the board assembly design 411, the layout unit 410 can automatically synchronize both of the layout representations of the board assembly design 411 in response to the user input 441. This automatic synchronization by the layout unit 410 can include identifying an alteration in one layout representation of the board assembly design 411 and utilizing that alteration as input to augment the other layout representation of the board assembly design 411, which can synchronize both of the layout representations of the board assembly design 411.

In some embodiments, the layout unit 410 can utilize a master-slave model for synchronizing the data models corresponding to the board assembly design 411. The layout unit 410 may statically assign a master-slave relationship, for example, with the two-dimensional unit 412 configured as a master and the three-dimensional unit 414 configured as a slave. In other examples, the master-slave designation can be dynamically assigned to either the two-dimensional unit 412 or the three-dimensional unit 414, for example, based on the user input 441. The master-slave configuration in the layout unit 410 can allow the master to make modifications to its layout representation of the board assembly design 411 in response to the user input 441, and then allow the slave to make modifications to its layout representation of the board assembly design 411 in response to direction from the master. In some embodiments, the master can prompt or direct the slave by replicating its data model corresponding to the board assembly design 411, which can prompt the slave to augment the replica data model with component models and mechanical constraints corresponding to the data model of the slave.

The printed circuit board layout tool 400 can analyze the first and the second layout representations for congruency with the design rules, for example, as described in a block 805 of FIG. 8. For example, the layout unit 410 can perform various design rule checks on the board assembly design 411 to determine whether the updates in the board assembly design 411 violate any design rules or their associated electro-mechanical constraints. The electro-mechanical constraints can include at least one electrical constraint or mechanical constraint for the board assembly design 411. In some embodiments, the layout unit 410 can review locations and characteristics of component models placed in the data model of the board assembly design 411 to determine whether the component models, as placed, conform to the design rules. The layout unit 410 can provide some granular user options for its design rule checking, for example, allowing user control over which portions of the board assembly design 411 to check for consistency with the design rules. For example, the layout unit 410 can compare different portions of the printed circuit board described in the board assembly design 411, such as a printed circuit board assembly, a component on the printed circuit board, a bond wire on the printed circuit board, a particular portion of the printed circuit board itself, such as a board edge, or the like, with each other. The layout unit 410 also can compare different portions of the printed circuit board described in the board assembly design 411 with other portions of the product, such as other printed circuit boards in the product, mechanical constraints derived or identified from the mechanical assembly design 404, or the like.

In some embodiments, the printed circuit board layout tool 400 can perform design rule checks on both the first and the second layout representations in response to the user input 441. For example, upon receiving user input 441 that alters a layout representation of the board assembly design 411, the printed circuit board layout tool 400 can automatically synchronize one or more other layout representations with the altered layout representation and automatically perform design rules on the synchronized layout representations.

The layout unit 410 can update the display presentation 442 based on the user input 441, for example, to illustrate the placement of a selected part or route of a trace line and highlight conformance or lack thereof with at least one of the design rules. This interactive design process can continue until layout of the circuit design 402 has been completed and thus the layout unit 410 has generated the board assembly design 411 congruent with the mechanical assembly design 404.

Figure 7:
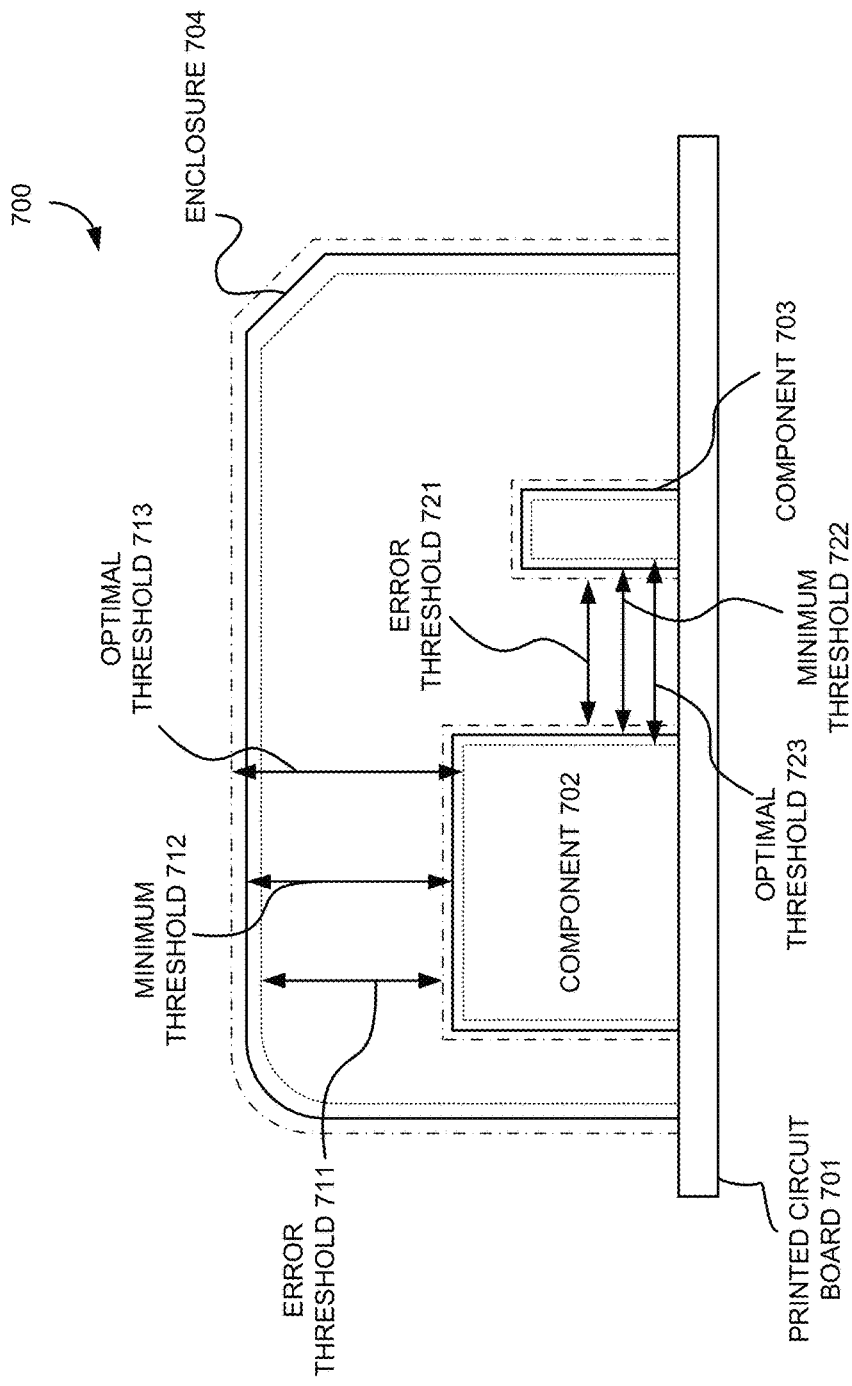
FIG. 7 illustrates an example representation of design rules based on physical dimensions of components in a printed circuit board layout according to various embodiments of the invention.

FIG. 7 illustrates an example representation of design rules based on physical dimensions of components 702 and 703 in a printed circuit board layout 700 according to various embodiments of the invention. Referring to FIG. 7, the printed circuit board layout 700 can include multiple components 701 and 703 placed on a printed circuit board 701. The printed circuit board layout 700 can also include mechanical features, such as an enclosure 704, which can constrain placement of the components 701 and 703 placed on the printed circuit board 701 and the overall design of the printed circuit board layout 700.

A printed circuit board layout tool can perform design rule checks on the printed circuit board layout 700, which can check placement of components 702 and 703 relative to different features of the printed circuit board layout 700, such as relative to the enclosure 704 and relative to themselves. In some embodiments, the design rule checks can compare spacing of various portions of the printed circuit board layout 700, such as between components, between a component and a mechanical feature, or the like. For example, the printed circuit board layout tool can compare spacing between the component 702 and the enclosure 704 against one or more threshold distances, such as an error threshold 711, a minimum threshold 712, and/or an optimal threshold 713. Similarly, the printed circuit board layout tool can compare spacing between the components 702 and 703 against one or more threshold distances, such as an error threshold 721, a minimum threshold 722, and/or an optimal threshold 723. By comparing spacing against multiple thresholds, the printed circuit board layout tool can provide a granular result of the design rule check, for example, whether the spacing checked by the printed circuit board layout tool correspond to an error distance, a minimum distance, or an optimal distance.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software or code (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   receiving, by a printed circuit board layout tool implemented with a computing system, a mechanical design from a mechanical system, wherein the mechanical design describes a physical structure of a product to include an electronic device comprising a printed circuit board coupled with one or more components;
   generating, by the printed circuit board layout tool implemented with the computing system, a design rule describing a physical limitation for the electronic device based on a mechanical constraint in the mechanical design;
   altering, by the printed circuit board layout tool implemented with the computing system, a first layout representation for a circuit design describing the electronic device;
   automatically augmenting, by the printed circuit board layout tool implemented with the computing system, a second layout representation for the circuit design in response to the alteration of the first layout representation for the circuit design describing the electronic device, which synchronizes the second layout representation for the circuit design describing the electronic device with the first layout representation for the circuit design describing the electronic device; and
   in response to the alteration of the first layout representation for the circuit design describing the electronic device, automatically performing, by the printed circuit board layout tool implemented with the computing system, at least one design rule check to compare the augmented second layout representation for the circuit design describing the electronic device with the physical limitation for the electronic device described in the design rule, wherein the electronic device, when manufactured utilizing at least one of the first layout representation for the circuit design or the second layout representation for the circuit design, is configured for inclusion in the product.

2. The method of claim 1, wherein altering the first layout representation for the circuit design is performed by a first kernel of the computing system, and automatically augmenting the second layout representation for the circuit design is performed by a second kernel of the computing system.

3. The method of claim 1, wherein one of the first or second layout representations corresponds to a 2.5-dimensional data model of the circuit design, and the other of the first or second layout representations corresponds to a 3-dimensional data model of the circuit design.

4. The method of claim 1, wherein one of the first or second layout representations corresponds to a 2.5-dimensional graphical presentation of the circuit design, and the other of the first or second layout representations corresponds to a 3-dimensional graphical presentation of the circuit design.

5. The method of claim 1 further comprises generating, by the printed circuit board layout tool implemented with the computing system, a first data model corresponding to the first layout representation for the circuit design by replicating a second data model corresponding to the second layout representation for the circuit design and augmenting the replica of the second data model with component models associated with the first layout representation for the circuit design.

6. The method of claim 1 further comprises augmenting a portion of a graphical presentation of the circuit design corresponding to the alteration of the first layout representation, which annunciates a result from the performance of the design rule check that compared the augmented second layout representation with the physical limitation for the electronic device described in the design rule.

7. The method of claim 1 further comprises presenting, by the printed circuit board layout tool implemented with the computing system, at least one of the first and second layout representations of the circuit design in a graphical display.

8. A system comprising:
a memory device configured to store machine-readable instructions; and
a computing system including one or more processing devices, in response to executing the machine-readable instructions, configured to:
receive, by a printed circuit board layout tool implemented in the computing system, a mechanical design from a mechanical system, wherein the mechanical design describes a physical structure of a product to include an electronic device comprising a printed circuit board coupled with one or more components;
generate, by the printed circuit board layout tool implemented with the computing system, a design rule describing a physical limitation for the electronic device based on a mechanical constraint in the mechanical design;
alter, by the printed circuit board layout tool implemented with the computing system, a first layout representation for a circuit design describing the electronic device;
augment, by the printed circuit board layout tool implemented with the computing system, a second layout representation for the circuit design in response to the alteration of the first layout representation for the circuit design describing the electronic device, which synchronizes the second layout representation for the circuit design describing the electronic device with the first layout representation for the circuit design describing the electronic device; and
in response to the alteration of the first layout representation for the circuit design describing the electronic device, automatically perform, by the printed circuit board layout tool implemented with the computing system, at least one design rule check to compare the augmented second layout representation for the circuit design describing the electronic device with the physical limitation for the electronic device described in the design rule, wherein the electronic device, when manufactured utilizing at least one of the first layout representation for the circuit design or the second layout representation for the circuit design, is configured for inclusion in the product.

9. The system of claim 8, wherein the one or more processing devices, in response to executing the machine-readable instructions, are configured to implement a first kernel to alter the first layout representation for the circuit design.

10. The system of claim 9, wherein the one or more processing devices, in response to executing the machine-readable instructions, are configured to implement a second kernel to augment the second layout representation for the circuit design.

11. The system of claim 8, wherein one of the first or second layout representations corresponds to a 2.5-dimensional data model of the circuit design, and the other of the first or second layout representations corresponds to a 3-dimensional data model of the circuit design.

12. The system of claim 8, wherein the one or more processing devices, in response to executing the machine-readable instructions, are configured to augment a portion of a graphical presentation of the circuit design corresponding to the alteration of the first layout representation, which annunciates a result from the performance of the design rule check that compared the augmented second layout representation with the physical limitation for the electronic device described in the design rule.

13. The system of claim 8, wherein the mechanical constraint at least one of a description an enclosure for an electronic device defined by the circuit design, fasteners to affix the electronic device defined by the circuit design to the enclosure, an addition electronic device to be coupled to the electronic device defined by the circuit design, or one or more heat dissipation devices to be coupled to the electronic device defined by the circuit design.

14. An apparatus comprising at least one computer-readable memory device storing instructions configured to cause one or more processing devices to implement a printed circuit board layout tool to perform operations comprising:
receiving, by a printed circuit board layout tool, a mechanical design from a mechanical system, wherein the mechanical design describes a physical structure of a product to include an electronic device comprising a printed circuit board coupled with one or more components;
generating, by the printed circuit board layout tool, a design rule describing a physical limitation for the electronic device based on a mechanical constraint in the mechanical design;
altering, by the printed circuit board layout tool, a first layout representation for a circuit design describing the electronic device;
augmenting, by the printed circuit board layout tool, a second layout representation for the circuit design in response to the alteration of the first layout representation for the circuit design describing the electronic device, which synchronizes the second layout representation for the circuit design describing the electronic device with the first layout representation for the circuit design describing the electronic device; and in response to the alteration of the first layout representation for the circuit design describing the electronic device, automatically performing, by the printed circuit board layout tool, at least one design rule check to compare the augmented second layout representation for the circuit design describing the electronic device with the physical limitation for the electronic device described in the design rule, wherein the electronic device, when manufactured utilizing at least one of the first layout representation for the circuit design or the second layout representation for the circuit design, is configured for inclusion in the product.

15. The apparatus of claim 14, wherein the one or more processing devices, in response to the instructions, are configured to implement a first kernel to alter the first layout representation for the circuit design and to implement a second kernel to augment the second layout representation for the circuit design.

16. The apparatus of claim 14, wherein one of the first or second layout representations corresponds to a 2.5-dimensional data model of the circuit design, and the other of the first or second layout representations corresponds to a 3-dimensional data model of the circuit design.

17. The apparatus of claim 14, wherein one of the first or second layout representations corresponds to a 2.5-dimensional graphical presentation of the circuit design, and the other of the first or second layout representations corresponds to a 3-dimensional graphical presentation of the circuit design.

18. The apparatus of claim 14, wherein the instructions configured to cause the one or more processing devices to perform operations further comprising generating, by the printed circuit board layout tool, a first data model corresponding to the first layout representation for the circuit design by replicating a second data model corresponding to the second layout representation for the circuit design and augmenting the replica of the second data model with component models associated with the first layout representation for the circuit design.

19. The apparatus of claim 14, wherein the instructions configured to cause the one or more processing devices to perform operations further comprising augmenting a portion of a graphical presentation of the circuit design corresponding to the alteration of the first layout representation, which annunciates a result from the performance of the design rule check that compared the augmented second layout representation with the physical limitation for the electronic device described in the design rule.

20. The apparatus of claim 14, wherein the instructions configured to cause the one or more processing devices to perform operations further comprising presenting at least one of the first and second layout representations of the circuit design in a graphical display.

* * * * *